United States Patent [19]
Chahroudi

[11] Patent Number: 5,377,042
[45] Date of Patent: Dec. 27, 1994

[54] STRUCTURE AND PREPARATION OF AUTOMATIC LIGHT VALVES

[76] Inventor: Day Chahroudi, P.O. Box 497, Placitas, N. Mex. 87043

[21] Appl. No.: 169,739

[22] Filed: Dec. 20, 1993

Related U.S. Application Data

[63] Continuation of Ser. No. 927,538, Jul. 24, 1992, abandoned, which is a continuation of Ser. No. 948,039, Dec. 31, 1986, abandoned.

[51] Int. Cl.$^5$ .......................... G02F 1/01; G01D 15/34
[52] U.S. Cl. ..................................... 359/241; 359/288; 359/289; 359/228; 359/296
[58] Field of Search ............... 359/288, 228, 241, 296, 359/238, 242, 289

[56] References Cited

U.S. PATENT DOCUMENTS

| | | | |
|---|---|---|---|
| 3,790,250 | 2/1974 | Mitchell | 350/353 |
| 3,884,414 | 5/1975 | Baer | 126/425 X |
| 3,953,110 | 4/1976 | Chahroudi | 350/266 |
| 4,064,872 | 12/1977 | Caplan | 359/43 |
| 4,082,892 | 4/1978 | Frump | 428/332 |
| 4,085,999 | 4/1978 | Chahroudi | 350/354 X |
| 4,137,769 | 2/1979 | Parker | 374/134 |
| 4,167,934 | 9/1979 | Miles | 126/422 |
| 4,169,661 | 10/1979 | Yamada et al. | 350/353 |
| 4,260,224 | 4/1981 | Takayama | 350/335 |
| 4,260,225 | 4/1981 | Walles | 350/353 |
| 4,261,331 | 4/1981 | Stephens | 350/353 X |
| 4,307,942 | 12/1981 | Chahroudi | 350/353 |
| 4,358,476 | 11/1982 | Zimmer et al. | 427/44 |
| 4,409,383 | 10/1983 | Zalucha et al. | 528/499 |
| 4,444,846 | 4/1984 | Zalucha et al. | 428/425.6 |
| 4,476,854 | 10/1984 | Baer | 126/425 |
| 4,536,061 | 8/1985 | Nishimura | 350/354 |
| 4,832,466 | 5/1989 | Nishimura et al. | 359/289 |
| 4,900,135 | 2/1990 | Yuasa et al. | 359/241 |
| 5,007,714 | 4/1991 | Nishimura et al. | 359/241 |

FOREIGN PATENT DOCUMENTS 61-225203 10/1986 Japan .

OTHER PUBLICATIONS

"Thinking window can switch off the sun," *Popular Science*, 5 Smay, Mar., 1984.

Primary Examiner—Robert P. Limanek
Assistant Examiner—Mahshid Saadat
Attorney, Agent, or Firm—Willian Brinks Hofer Gilson & Lione

[57] ABSTRACT

A structure consisting of two cover layers sandwiching a polymer and solvent layer is useful for making automatic light valves. Mechanical and optical properties are improved by a novel continuous network of bonds which transmit stresses from one cover layer, to and among the polymer chains, and then to the second cover layer. The laboratory and factory preparation methods necessitated by this layered and bonded structure are described. These automatic light valves may be used for making optical displays, processing information, and building apertures.

37 Claims, 5 Drawing Sheets

STRUCTURE AND PREPARATION OF AUTOMATIC LIGHT VALVES

This is a continuation application of application Ser. No. 07/927,538 filed Jul. 24, 1992, which is a continuation of application Ser. No. 06/948,039 filed Dec. 31, 1989, both now abandoned.

This invention relates to Improved structures for light valves and the methods of manufacture necessitated by these improved structures. The materials used to make the structures of the present Invention are the subject of a copending application Ser. No. 07/927,537.

PRIOR ART

Previously, most light valves have been based on mechanical and/or electrical operation. For example, the means for varying the amount of sunlight admitted into buildings includes curtains, venetian blinds, seasonal paint for greenhouses, and skylids. Skylids are automatic mechanical shutters which are actuated thermally by sunlight. Mechanical light valves for buildings are surveyed in "Thermal Shutters and Shades" by W. A. Shurcliff, Brick House, Andover, Mass.

Other examples of light valves are thin layers of liquid crystals in wrist watches and other displays, electrochromic coatings for automobile rear view mirrors which turn dark electronically, Kerr electro-optic cells for laser modulation, and photochromic glass for eyeglasses. Other light valves are discussed In "Electrocromic and Thermochromic Materials for Solar Energy Applications" USDOE Report LBL-18299.

Mechanical and electrical light valves suffer from cost and reliability problems. Mechanical and electrical light valves require both a separate sensor to determine which state of the light valve is desired, and a means for the sensor to activate the light valve.

For many applications, light valves should not become highly absorptive of light when they are In their non-transmissive state. For windows and skylights, for example, It is preferred that incident sunlight is reflected rather than absorbed so that it does not become a heat load for the building. Light absorption is a problem with the above mentioned photochromic glass, and photochromic, electrochromic, and thermochromic coatings, which all turn dark.

White paint for greenhouses is labor intensive and thus expensive. Since it is applied and removed seasonally, plant growth is slower than it would be with a light valve whose transmission varied over a time scale of minutes.

A light valve which turns from transmissive to reflective upon heating above its transition temperature and then turns transmissive again upon cooling is called here a "thermo-optical shutter." Since it is activated automatically by its local temperature, a thermo-optical shutter may be used without any external control mechanism in some applications, such as solar heating. For some other applications, such as skylights, it is preferred that the thermo-optical shutter be activated by ambient light intensity instead of local temperature.

Structures, preparation methods, and materials for thermo-optical shutters which are related to the present invention, and which are patented by the inventor, are given in U.S. Pat. Nos. 3,953,110 and 4,085,999 and 4,307,942.

Previous thermo-optical shutters related to the present invention have overcome the problems listed above for other types of light valves, but they have not performed as well as the present invention because: they do not retain their opacity for as long; or lack shear strength; or are difficult to manufacture; or are prone to puncture damage; or are prone to freezing damage; or are activated only by their local temperature, and not by local light intensity; or do not have a transition temperature which can be varied continuously over a range during the manufacture of the shutter.

OBJECTS

The primary objects of this invention are a thermo-optical shutter with a structure enabling it to remain opaque for extended periods, which is simple and inexpensive to manufacture, and which is resistant to shear, creep, puncture and freezing. For some applications, a further object is a thermo-optical shutter which is activated by light intensity rather than temperature. A further object is a thermo-optical shutter whose transition temperature and light absorption can be varied continuously over a range during its manufacture. A further object is a thermo-optical shutter which reduces variations In incident light intensity. A further object is a visual display screen. Further objects will become apparent in the following text.

FIGURES

STRUCTURE

A typical structure of this invention consists of a thermo-optical shutter layer sandwiched between two cover layers. These cover layers may be clear plastic films. The thermo-optical shutter layer consists of polymer and solvent, where the polymer precipitates reversibly from solution above its transition temperature, thereby reflecting light. More strictly speaking, the polymer and solvent form separate phases which are finely divided. One of the phases is solvent rich, while the other phase is polymer rich. In some cases the polymer rich phase is continuous, while in some other cases the solvent rich phase is continuous. The polymer and solvent layer is said to be in "solution" when the polymer chains are distributed fairly homogeneously throughout the solvent. This situation includes gels and plasticized polymers.

After the polymer and solvent layer has stayed above its transition temperature for long periods, such as several days, or after the polymer and solvent layer has been subjected to freezing and thawing, the polymer and solvent must remain finely divided for the polymer and solvent layer to be highly reflective. Pockets of either solvent or polymer should be prevented.

Also, it is desirable for the polymer and solvent layer to have some mechanical strength, to bond the two cover layers together, and to resist the creep and shear forces which may be externally applied to the sandwich structure during installation and use. Both the ability to remain highly reflective for extended periods and the required mechanical strength can be imparted to the polymer and solvent layer by forming bonds both among the polymer chains and also between the polymer chains and both cover layers. Forming this network of bonds is here called "curing" the polymer and solvent layer.

Figure 1:
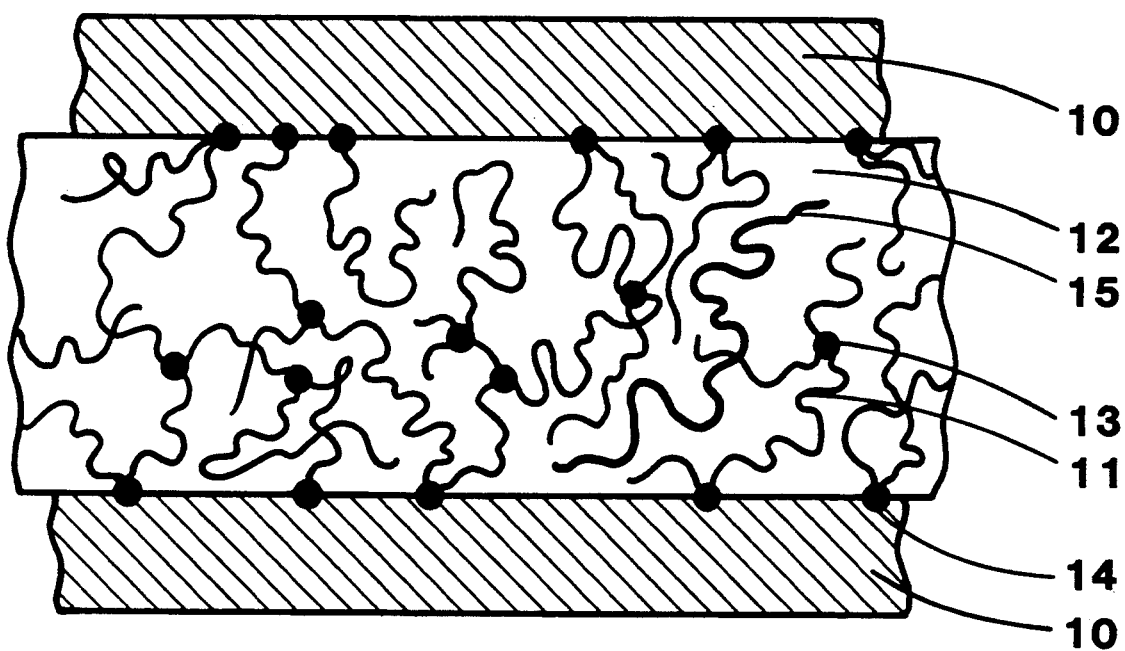
FIG. 1 shows a three layered structure which may be used for a thermo-optical shutter.

In FIG. 1, showing a fragmentary, sectional, schematic view of a typical three layered sandwich structure, 10 are the cover layers, 11 is a polymer chain, 12 is the solvent for the polymer chains, 13 is a bond between two polymer chains, or an "interchain bond," 14 is a bond between a polymer chain and a cover layer, or an "interface bond," and 15 is a polymer chain which is not bonded.

Figure 2:
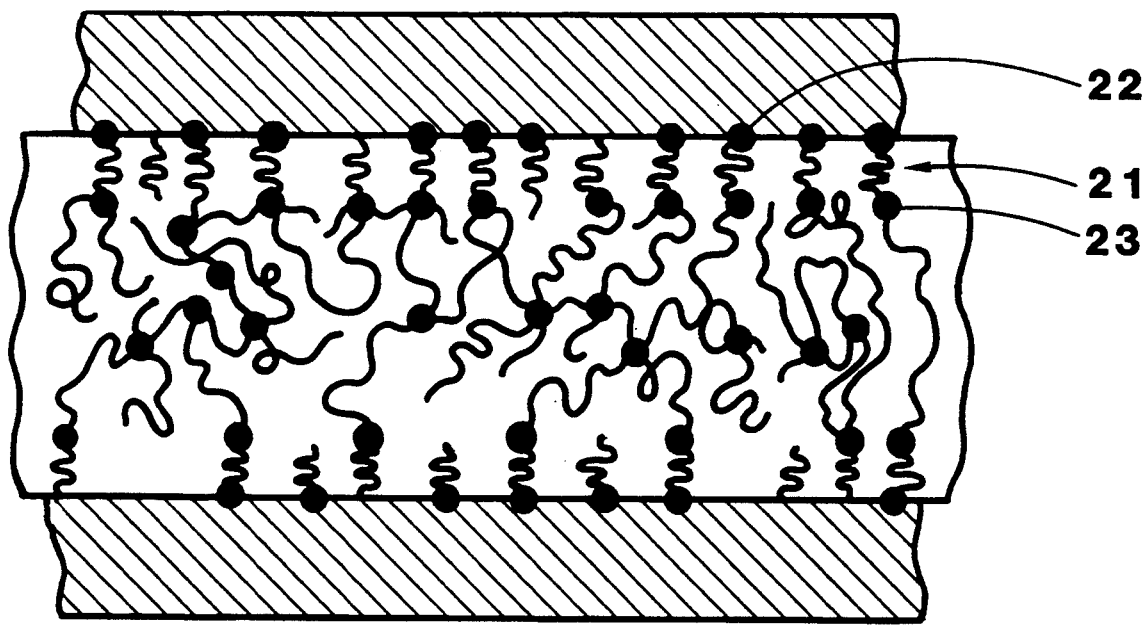
FIG. 2 shows a a five layered structure.

In FIG. 2, showing a fragmentary, sectional, schematic view of a typical five layered sandwich structure, the parts are the same as in FIG. 1, except that layers of an "interface bonder," 21, are between the polymer chains and the cover layers, and 22 is a bond between a layer of interface bonder and a cover layer, and 23 is a bond between a layer of interface bonder and a polymer chain. The layer of interface bonder need not be continuous on a microscopic scale to be effective.

Stress may be generated within the middle layer of the sandwich structure when the polymer solution passes through its transition temperature or when the solvent freezes. The resultant phase separations change the conformation of the polymer chains, thereby stressing these chains and their interchain bonds and interface bonds. If stresses break these bonds, then pockets of separated polymer or solvent will form, thereby reducing the thermo-optical shutter's reflectivity and mechanical strength.

To resist internally and externally generated stresses, the molecular topology of the sandwich structure is such that stress can travel continuously from one cover layer, through bonds to the polymer chains, through bonds to the second cover layer. In examples 1, 2, and 3 to follow, the cover layers are connected to each other by a strong network of stable covalent bonds. These bonds go continuously from one cover layer to a layer of interface bonder to the layer of optical shutter polymer and solvent to another layer of interface bonder to the second cover layer, as is shown in FIG. 2. This layered and bonded structure and the methods of manufacture necessitated by it are the core of this invention.

MANUFACTURING METHODS

The polymer solution may be made with a viscosity from thixotropic to syrupy to suit the coating process employed, which may, for example, be cold extrusion, knife coating, or curtain coating. After coating onto the first cover layer, the polymer solution may then be covered with or laminated to the second cover layer. This may be done, for example, with a pair of rollers which are separated by a gap equal to the thickness of the finished product. These rollers simultaneously form the sandwich, meter the thickness of the polymer solution layer, and hold the top cover layer in place and under tension.

When heat may damage the sandwich, low heat curing shouted be used; for example, cure initiation by visible or ultraviolet light, or electron beam or curtain. Even these cure initiation methods involve some heat, so it is desirable to cool the uncured sandwich before or during curing with, for example a chill drum, or cooled belt, or a moving fluid, such as cold air.

Figure 3:
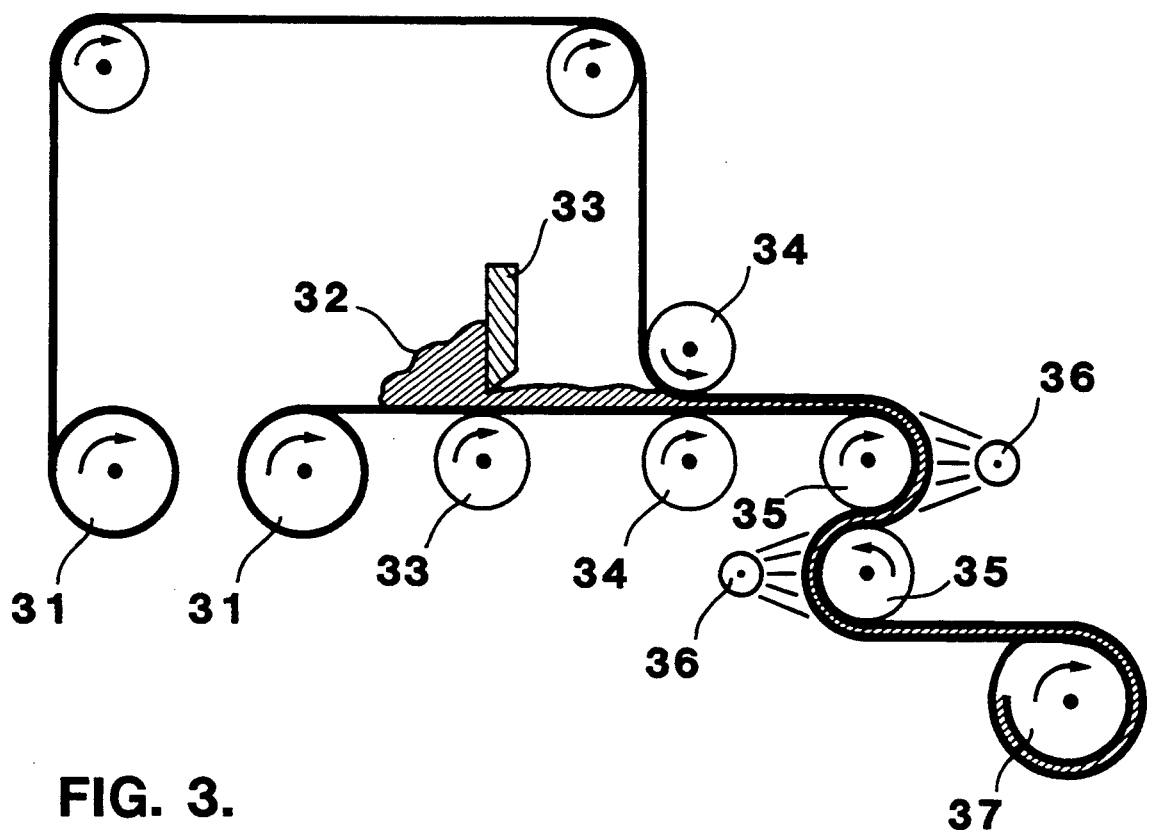
FIG. 3 shows a typical production line for the above structures.

In FIG. 3, showing a schematic of a typical method of manufacturing the sandwich structure, 31 are unwind stations for the rolls of cover layer film, 32 is uncured polymer solution, 33 is a knife over roll coating station which coats the uncured polymer solution onto the bottom cover layer, 34 is a nip roll station which both laminates the top cover layer onto the uncured polymer solution and bottom cover layer, and which also meters the amount of uncured polymer solution between the two cover layers, 35 are rollers which cool the sandwich before and while it is being cured, 36 are radiation sources which cure the sandwich, and 37 is a windup station for the cured sandwich.

The manufacturing apparatus shown in FIG. 3 is not unique and should not be construed as limiting this invention. For example, the knife over roll coater, 33, and the laminating rollers, 34, may be. combined by eliminating 33. Or, the lower laminating roller, 34, may be cooled to eliminate the two cooling rollers, 35. Or, the two cooling rollers, 35, and the two radiation sources, 36, may be replaced by a single cooled roller and radiation source. Or, the coater roller, 33, and the lower laminating roller, 34, and the cooling rollers, 35, may all be replaced by a cooled belt. Or, some or all the rollers may be replaced with nonrotating bars or drums. Or, the top cover layer may be replaced with a release film, which, as a separate step on a different apparatus, is later removed and replaced with the top cover layer.

The cured sandwich should have enough shear strength to resist delamination from rough handling during installation and use. If the sandwich is punctured, it is desirable that the loss of solvent from the inner layer be confined to the local area of the puncture, so that the entire sheet of sandwich does not cease to function. Both shear strength and puncture resistance can be Imparted to the sandwich by forming a grid of seals between the cover layers, where the weaker inner layer has been removed from the area of the seal. The grid of seals may be square, hexagonal, etc. For some applications, the seals should be as thin as possible to reduce light transmission through the seals when the thermo-optical shutter is in its reflective state.

The seals may be made either on the same production line as the sandwich or on a separate production line. For example, two methods of forming the seal grid are heat sealing and ultrasonic welding. The weak inner layer of the sandwich may be removed from the seal area by pressure from the sealing element. With heat sealing, this pressure may be reduced before the cover layers melt to prevent excessive thinning of the cover layers at the seal. A laminated cover layer may be used with a higher melting polymer on the outside of the sandwich.

Figure 4A:
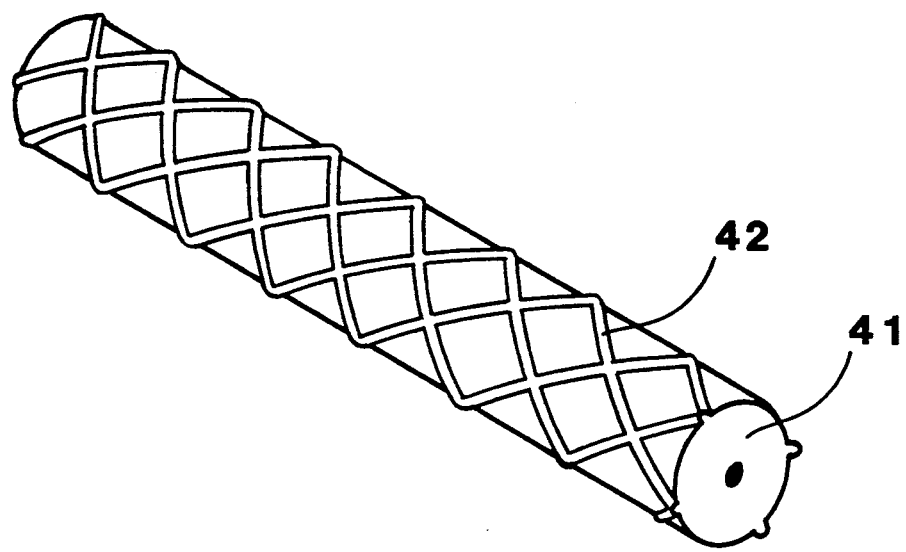
FIGS. 4A and 4B show a method for forming a grid of ultrasonic seals through the above structures.
Figure 4B:
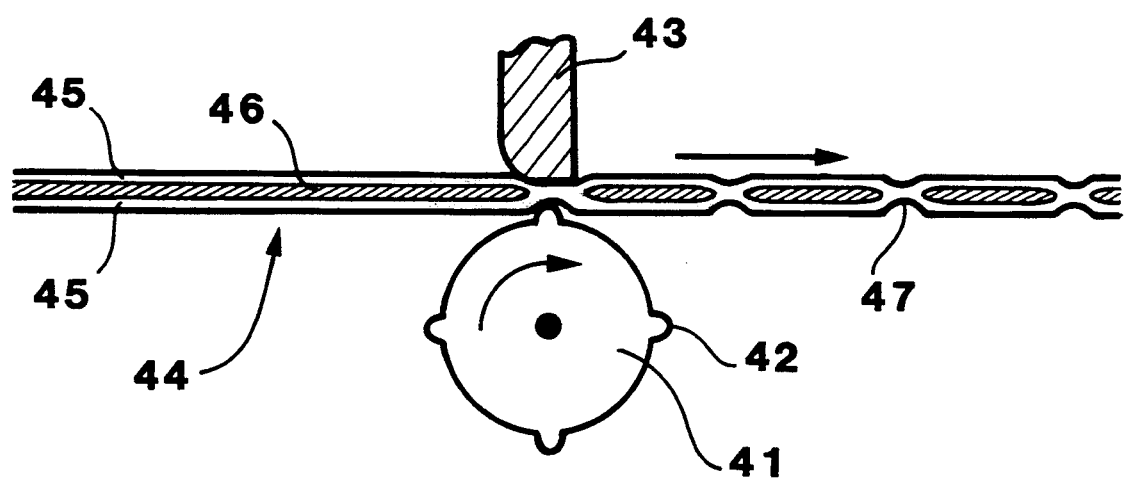

For ultrasonic sealing as a continuous web process, if is useful to have a drum with the seal pattern in raised ribs on its surface. This drum rotates with the web to carry it under the stationary ultrasonic horn or horns, where first the polymer and solvent layer is squeezed away from the area of the seal and then the seal is made in a single pass.

in FIGS. 4A and 4B, showing a schematic of a typical manufacturing method for making ultrasonic seals between the cover layers, 41 is a roller, 42 is a grid of raised ribs which forms the seals, 43 is an ultrasonic horn, 44 is an unsealed sandwich of cover layers and a polymer and solvent layer, 45 are the cover layers, 46 is the polymer and solvent layer, and 47 is a seal between the cover layers.

For ease of manufacture, it is desirable that the polymer solution layer have a high viscosity when the sandwich is formed. This permits easy formation of a sandwich with uniform thickness. Also it is desirable for the sandwich curing to create as little heat as possible, since it has been found that If the polymer and solvent layer is cured while above its transition temperature, the sharpness of the transition temperature is reduced.

The high viscosity of the uncured polymer solution, and the low heat of curing can both be effected by using a solution of the polymer, with the polymer's degree of polymerization above ten, rather than forming the sandwich directly from a monomer solution. In curing, these polymer chains are subsequently bonded to each other. The bonds may, for example, be chemical, van der Walls or electrostatic; although hydrolytically stable covalent bonds are preferred with water solvents.

For the sandwich structure to cure, it is necessary to have bonding sites on both the polymer chains and the inner surfaces of the cover layers. The bonding sites on the polymer chains may consist of, for example, unsaturation or other functionality, or sites made during the cure by a "bond site maker" which is in the uncured polymer solution. The bonding sites on the cover layers may consist of, for example, functionality made by vacuum or atmospheric plasma pretreatment, or sites made during cure by a bond site maker.

The bonding sites on the polymer chains may be bonded to each other during cure either directly or by an "interchain bonder" which is in the uncured polymer solution. The bonding sites on the cover layers may bond either directly to the bonding sites on the polymer chains or they may bond to an Intermediate layer of "interface bonder" which bonds, in turn, to the bonding sites on the polymer chains. This interface bonder is in the uncured polymer solution, but it should have lower solubility than the interchain bonder because it must form at least partial monolayers between the cover layers and the polymer solution.

Another method of curing the sandwich structure is to cold extrude a thixotropic polymer solution between two cover layers, and then allow the polymer to cure slowly over time, for example with the sandwich stored in rolls. In this case the curing of both the polymer in solution and the cover layer inner surfaces may be activated, for example, by mixing the polymer solution from two reactive components before extrusion.

The polymer solution components may also react quickly. In this case, the mixing and the forming of the polymer layer must be done in rapid succession; using, for example, a mixer combined with extruder similar to those used for forming urethane coatings commercially. With rapid cure, the components need not be highly thixotropic.

In order to adjust the transition temperature precisely over a range for various applications, it is useful to make the polymer from two or more monomers which, when polymerized alone, would make polymers with different transition temperatures. The transition temperature of the copolymer will then be a function of the monomer ratios. It has been found that the copolymerization should be somewhat random so that the transition temperature is both sharp and less sensitive to solvent concentration. For example, block copolymers are much less satisfactory than random copolymers in both of the above properties.

OPERATION

There are applications for thermo-optical shutters where a constant level of transmitted light is desired, even though incident light levels are varying. These applications include daylight illumination sources such as skylights. This effect can be achieved by adding a small amount of an inert dye, such as carbon black, to the polymer solution. Alternately, a cover layer with light absorption may be used. The resulting absorption causes the thermo-optical shutter to be heated by the incident light and turn reflective.

Figure 5:
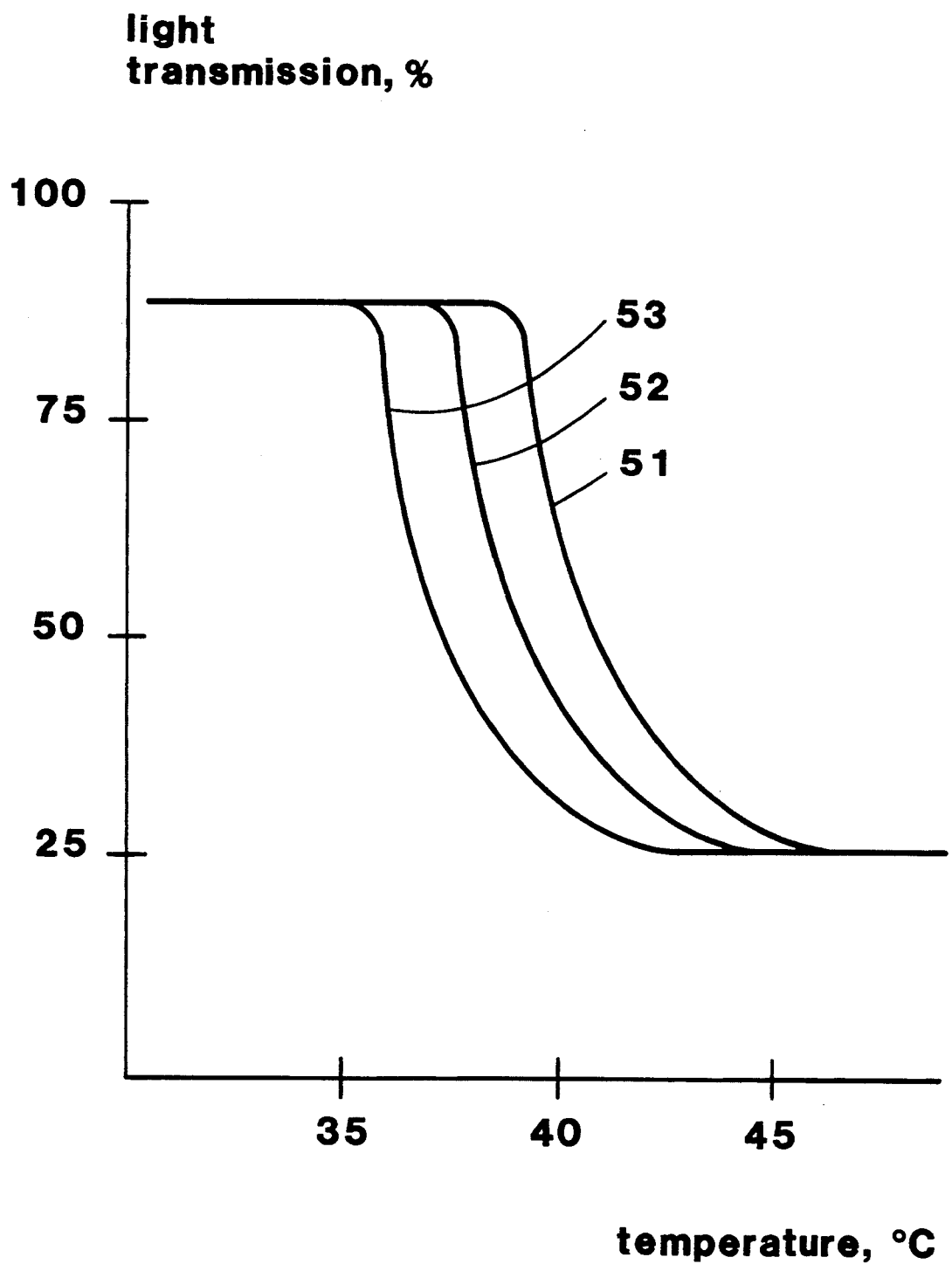
FIG. 5 shows the light transmission of a typical therma-optical shutter with the above structure as a function of both temperature and incident light intensity.

In FIG. 5, showing a typical set of graphs of direct plus diffuse light transmission of the thermo-optical shutter as a function of both temperature and incident light intensity, 51 is the transmission at low light intensity, 52 is the transmission at medium light intensity, and 53 is the transmission at high light intensity.

For a given illumination source configuration and orientation, a unique amount of light absorption exists such that the transmitted light is most nearly constant, even though incident light levels may vary over a wide range. Similarly, for a given configuration, orientation, and ambient thermal regime, a unique transition temperature exists such that the transmitted light is most nearly constant.

The invariance of the transmitted light intensity may be further enhanced by having the light absorption take place primarily after the thermo-optical shutter layer. With this structure, the absorber is shaded by the shutter when it is in its reflective state. For the following applications, the definition of a thermo-optical shutter is expanded to include the case where the shutter turns reflective cooling rather than heating, as it did in the previous applications.

A thermo-optical shutter may be used to make a visual display which may be either transparent or opaque when there is no image on the screen. For example, the shutter may form a screen which is scanned in a raster pattern by a thin beam of invisible infrared light, which is analogous to the electron beam in a TV tube. The infrared light is absorbed by an element of the shutter and heats it above its transition temperature which switches its state of reflectivity. Thus the pattern of reflectivity on the shutter screen is controlled by modulating the intensity of the Infrared beam as it scans. Alternately, a shutter element may be heated electrically by a grid of resistive elements one of the cover layers. The grid may be of the coincident circuit type, and the resistive elements may be transparent.

A thermo-optical shutter may be used to form a hologram which is variable in time. The hologram is written with a wavelength of coherent light that is absorbed by the shutter and thereby heats it. It is read with wavelengths that are not absorbed. Because it is a hologram, the read and write wavelengths should be harmonics for good performance. The thickness of the shutter may be many times a wavelength of light, so the shutter may form a three-dimensional hologram.

This variable hologram may be used to form a three-dimensional display, preferably by reading it with coherent light. Alternately, it may be used for optical information processing. For example, since a thermo-optical shutter which has some absorption and which is near its transition temperature is a highly non-linear optical medium, as is shown in FIG. 5, it may be used to form a phase conjugation mirror. This mirror may be used for optical pattern recognition, for example.

TEST METHODS AND APPARATUS

The performance of the bonding of the sandwich is measured in two ways. In the first test, a sample sandwich is immersed in hot water for one hour and then immersed in water which is 30° C. below its transition temperature. If separation between a cover layer and the cured polymer and solvent layer has occurred, the interface has a surface appearance similar to orange peel. The temperature of the hot water is raised in 5° C. steps until separation occurs. If a temperature of 30° C. above the transition temperature has been reached, the interface bonding is satisfactory.

The second test measures bonding by immersing a sample sandwich with one cover film carefully peeled off in solvent which is 30° C. below the transition temperature. The solvent used is the same as the solvent in the sandwich. On immersion the cured polymer solution layer expands due to the uptake of solvent, which puts both interchain and interface bonds under strain. If no separation of the polymer solution layer from the cover layer occurs with in 48 hours, both the interface bonding and the interchain bonding are satisfactory.

Passing both of the above bonding tests shows that the sandwich has a bonded structure satisfying claim 1.

The apparatus for measuring direct plus diffuse light transmission versus temperature, as shown in FIG. 5, consists of a light bulb and a photoelectric cell detector spaced a centimeter apart and immersed in a stirred water bath. The bath temperature is control led with a hot plate and a cooling coil. The signals from the photoelectric cell and a thermistor in the bath go to an X-Y recorder, which gives a plot of light transmission versus temperature. A sharpness in transition temperature of 5° C. or less is satisfactory.

To measure the sensitivity of the transition temperature to the concentration of the polymer in the sol vent, one cover layer is carefully peeled off a sample sandwich. The sample is then partially dried and weighed to determined the new polymer concentration. The cover layer is replaced, the sandwich edges are resealed, and a new transmission versus temperature curve is measured. When the polymer concentration has changed from 30% to 60%, a change in transition temperature of 5° C. or less is satisfactory.

EXAMPLE 1

A thermo-optical shutter polymer solution which is highly viscous may consist of polyvinylmethyl ether in water. This solution is made capable of curing, or bonding to both itself and the cover layers, by mixing in the following bonding additives:

| | |
|---|---|
| Polymer Solution | 100 g |
| (30% polyvinylmethyl ether, GAF) | |
| Bond Site Maker | 0.15 g |
| (hydrogen peroxide) | |
| Interchain Bonder | 1.5 g |
| (methylene bisacrylamide, Aldrich) | |
| Interface Bonder | 0.15 g |
| (divinyl spirodioxane, Aldrich) | |
| photoinitiator | 0.5 g |
| (methyl phenylglyoxylate, Aldrich) | |

The optical shutter sandwich structure may be prepared by the following process: On a clean piece of cover layer, for example a clear film of polyvinylacetate or polypropylene, is placed a spacer frame three millimeters in thickness and enclosing an area of five by five centimeters. Some polymer solution, with the bonding additives mixed in, is placed in the area inside the spacer frame and a second piece of cover layer is placed over the spacer. This sandwich assembly is then pressed between two flat surfaces to form a layer of polymer solution of uniform thickness which fills the volume enclosed by the spacer frame and the cover layers.

Curing is initiated by ultraviolet light from a mercury lamp one meter from the sample. The above sandwich is placed on a metal tray which is resting on Ice for cooling. The sandwich is irradiated one hour on each side to cure it. The spacer is then removed and the sandwich edges are sealed by ultrasonic welding the two polymer cover films together through the cured polymer and solvent layer.

Sandwich structures prepared with the above methods pass all the above performance tests for bonding, transition temperature sharpness, and insensitivity to solvent concentration.

EXAMPLE 2

The sandwich structure, its preparation, and its performance are identical to Example 1 except that the polymer is replaced by a random copolymer, which is prepared from the following ingredients:

| | |
|---|---|
| Monomer 1 | 94 g |
| (N-isopropyl acrylamide, Eastman Kodak) | |
| Monomer 2 | 6 g |
| (acrylamide, Aldrich) | |
| Solvent | 400 g |
| (water) | |
| catalyst | 1 g |
| (1% potassium bisulphite, plus | |
| 1% potassium persulphate, in water) | |

The monomers are dissolved in the sol vent in a stirred reactor and the catalyst is added. The reactor is kept at 30° C. for 24 hours to complete the copolymerization. The copolymer solution is heated to 70° C., which causes the copolymer to coagulate, and sufficient solvent is removed to bring the remaining solution to 30% concentration. The mixture is then cooled and stirred until homogeneous.

By replacing the polymer of Example 1 with another polymer and still passing all of the above performance tests, this example shows that this invention, whose subject is a layered and bonded structure, is Independent of the particular materials used to make that structure. Some of these materials are the subject of a copending application Ser. No. 07/927537.

EXAMPLE 3

The sandwich structure, its preparation, and its performance are identical to Example 2 except that the random copolymer has a different ratio between monomer 1 and monomer 2 and thus a different transition temperature. For example, when the amount of monomer 2 is changed from 6% to 14% of the copolymer, the transition temperature changes from 35° C. to 45° C.

This example shows that the transition temperature can be varied over a range without loosing any performance properties.

EXAMPLES 4 THROUGH 7

The sandwich structures and their preparation are identical to Example 3 except that the bonding additives (i.e., bond site maker, interchain bonder, interface bonder, and photoinitiator) are each reduced, one at a time, to half the quantities listed in Example 1, while keeping all the other additives constant. The resulting four samples all fall one or both of the above bonding tests.

These examples show that although the quantities of bonding additives are minute, each plays an essential role.

I claim the following:

1. A layered structure having variable light reflectivity which is temperature-dependent, said structure comprising:

first and second cover layers, at least one of which is light transmissive; and an inner layer comprising a polymer and a solvent which form a homogenous solution within a preselected temperature range and which separate into polymer-rich and solvent-rich phases outside said preselected temperature range, said polymer-rich and solvent-rich phases together being substantially more reflective of light than said homogenous solution;

said polymer comprised of individual chains joined together with interchain bonds at points along their length and joined with interface bonds to said first and second cover layers.

2. A layered structure in accordance with claim 1 in which said polymer chains are joined with interface bonds to said first cover layer through a substantially transparent intermediate interface bonder layer positioned between said first cover layer and said inner layer.

3. A layered structure in accordance with claim 2 having light reflectivity which is temperature-dependent, said structure comprising: first and second cover layers, at least one of which is light transmissive; and an inner layer comprising a polymer and a solvent which form a homogeneous solution within a preselected temperature range and which separate into polymer-rich and solvent-rich phases outside said preselected temperature range, said polymer-rich and solvent-rich phases together being substantially more reflective of light than said homogeneous solution in which said first and second cover layers are sealed together by heat.

4. A layered structure in accordance with claim 1 in which said polymer chains are joined with said interface bonds to said first and second cover layers through a substantially transparent first and second intermediate interface bonder layers positioned between said first cover layer and said inner layer and between said inner layer and said second cover layer, respectively.

5. A structure in accordance with claim 4 wherein said interface bonder layers are formed from a polyunsaturated monomer.

6. A layered structure in accordance with claims 1, 2 or 4 in which said interface and interchain bonds are chemical bonds.

7. A layered structure in accordance with claims 1, 2 or 4 in which said interface and interchain bonds are primarily covalent and are stable with respect to said solvent.

8. The layered structure in accordance with claims 1, 2, or 4, said layered structure being partially absorptive of sunlight such that heat generated by light so absorbed increases said light reflectivity.

9. The structure in claims 1, 2 or 4 made by mixing a polymer solution with components which react to form the interface or interchain bonds.

10. The structure in claims 1, 2 or 4 with means for forming the interchain and interface bonds including one or more of: a functionality on the polymer chains, a functionality on a cover layer inner surface, a bond site maker, an interchain bonder, an interface bonder.

11. A structure in accordance with claims 1, 2 or 4 in which at least a portion of said bonds are initiated by radiation.

12. A structure in accordance with claims 1, 2 or 4 in which at least a portion of said interface bonds are initiated by radiation.

13. A structure as in claim 12 with means to cool the structure while the bonds are being formed.

14. A structure in accordance with claim 12 in which at least a portion of said interface bonds are initiated by ultraviolet radiation.

15. A structure in accordance with claim 14 wherein said monomer is divinyl spiro dioxane.

16. A structure as in claim 12 in which a portion of said bonds are initiated in the presence of a means to cool the structure before said bonds are formed.

17. A structure in accordance with claim 12 in which at least a portion of said interchain bonds are initiated by ultraviolet radiation.

18. A structure as in claim 12 in which a portion of said bonds are initiated in the presence of a means to cool the structure while said bonds are formed.

19. A structure in accordance with claims 1, 2 or 4 in which at least a portion of said interchain bonds are initiated by radiation.

20. A layered structure having variable light reflectivity which is temperature-dependent, said structure comprising: first and second cover layers, at least one of which is light transmissive; and an inner layer comprising a polymer and a solvent which form a homogeneous solution within a preselected temperature range and which separate into polymer-rich and solvent-rich phases outside said preselected temperature range, said polymer-rich and solvent-rich phases together being substantially more reflective of light than said homogeneous solution; where a portion of said polymer is a copolymer of at least two monomers, and said preselected temperature range is bounded by a transition temperature whose value varies with the relative amounts of said monomers, said polymer comprised of individual chains joined together with interchain bonds at points along their length and joined with interface bonds to said first and second cover layers.

21. A layered structure having variable light reflectivity which is temperature-dependent, said structure comprising: first and second cover layers, at least one of which is light transmissive; and an inner layer comprising a polymer and a solvent which separate into polymer-rich and solvent-rich phases outside said preselected temperature range, said polymer-rich and solvent-rich phases together being substantially more reflective of light than said homogeneous solution; where a portion of said polymer is a random copolymer of at least two monomers, and said preselected temperature range is bounded by a transition temperature whose value varies with the relative amounts of said monomers, said polymer comprised of individual chains joined together with interchain bonds at points along their length and joined with interface bonds to said first and second cover layers.

22. A layered structure comprising a thermochromic layer in between first and second cover layers having light reflectivity which is dependent on temperature, said structure being partially absorptive of varying levels of incident light such that heat generated by incident light so absorbed increases said reflectivity, and in which the light absorption occurs primarily after said incident light passes through said thermochromic layer in the direction of travel of the incident light, said thermochromic layer comprising a polymer and a solvent which form a homogeneous solution within a preselected temperature range and which separate into polymer-rich and solvent-rich phases outside said preselected temperature range, said polymer-rich and solvent-rich phases together being substantially less transmissive of light than said homogeneous solution, individual chains of said polymer being joined together with interchain bonds at points along their length, and joined with interface bonds to said first and second cover layers.

23. A structure in accordance with claim 22 in which said temperature dependence and the degree to which said structure is partially absorptive of incident light are selected such that said structure reduces variations in transmitted light intensity when incident light intensity and ambient temperature are within a preselected range such that transmitted light is regulated to provide more constant illumination.

24. A method for regulating solar energy transmission into a building, said method comprising:
(1) providing a layered structure having light reflectivity which is temperature-dependent, said structure comprising:
   first and second cover layers, at least one of which is light transmissive; and
   an inner layer comprising a polymer and a solvent which form a homogenous solution within a preselected temperature range and which separate into polymer-rich and solvent-rich phases outside said preselected temperature range, said polymer-rich and solvent-rich phases together being substantially more reflective of light than said homogenous solution;
said polymer comprised of individual chains joined together with interchain bonds at points along their length and joined with interface bonds to said first and second cover layers, said first and second cover layers and said inner layer all substantially non-absorbing of light, and
(2) placing in the path of said solar energy said layered structure.

25. A layered structure comprising a thermochromic inner layer between two polymeric cover layers in which said first and second cover layers are sealed together along lines forming a grid through said inner layer, said thermochromic inner layer comprising a polymer and a solvent which form a homogeneous solution within a preselected temperature range and which separate into polymer-rich and solvent-rich phases outside said preselected temperature range, said polymer-rich and solvent-rich phases together being substantially less transmissive of light than said homogeneous solution; individual chains of said polymer being joined together with interchain bonds at points along their length; and joined with interface bonds to said first and second cover layers.

26. A method for forming a layered structure having variable light transmissivity which is temperature-dependent, said method comprising:
(a) joining together
   (i) a first cover layer and a second cover layer, at least one of which is transparent; and
   (ii) an inner layer comprising a polymer and a solvent which form a homogeneous solution within a preselected temperature range and which separate into polymer-rich and solvent-rich phases outside said preselected temperature range, said polymer-rich and solvent-rich phases together being substantially less transmissive of light than said homogeneous solution;
(b) joining individual chains of said polymer together with interchain bonds at points along their length; and
(c) forming interface bonds between a portion of said chains and said first and second cover layers.

27. A method in accordance with claim 26 in which step (c) comprises forming said interface bonds between a portion of said chains and said first cover layer through an intermediate layer.

28. A method in accordance with claim 26 in which step (c) comprises forming said interface bonds between a portion of said chains and said first and second cover layers through first and second intermediate interface bonder layers, respectively.

29. A method for forming a layered structure having light reflectivity which is temperature-dependent, said structure comprising: first and second cover layers, at least one of which is light transmissive; and an inner layer comprising a polymer and a solvent which form a homogeneous solution within a preselected temperature range and which separate into polymer-rich and solvent-rich phases outside said preselected temperature range, said polymer-rich and solvent-rich phases together being substantially more reflective of light than said homogeneous solution; comprising forming said layered structure with said inner layer in between said first and second cover layer; said polymer comprised of individual chains joined together with interchain bonds at points along their length and joined with interface bonds to said first and second cover layers.

30. A method for forming a layered structure in accordance with claim 29 in which said first cover layer and said second cover layer are placed spaced apart by a fixed gap thereby defining the thickness of said inner layer.

31. A method for forming a layered structure in accordance with claim 30 in which said first cover layer and said second cover layer are placed spaced apart by a fixed gap formed by two parallel cylinders thereby defining the thickness of said inner layer.

32. A method for forming a layered structure in accordance with claim 30 in which said first cover layer and said second cover layer are placed spaced apart by a fixed gap formed by an extrusion die thereby defining the thickness of said inner layer.

33. A display screen capable of forming an image on the screen, from a temperature pattern comprising a layered structure having variable light reflectivity which is temperature-dependent, said structure comprising:
   first and second cover layers, at least one of which is light transmissive; and
   an inner layer comprising a polymer and a solvent which form a homogeneous solution within a preselected temperature range and which separate into polymer-rich and solvent-rich phases outside said preselected temperature range, said polymer-rich and solvent-rich phases together being substantially more reflective of light than said homogenous solution; said polymer comprised of individual chains joined together with interchain bonds at points along their length and joined with interface bonds to said first and second cover layers; said screen being formed on said inner layer.

34. A method for forming a layered structure in accordance with claim 33 in which said first cover layer and said second cover layer are placed spaced apart by a fixed gap formed by a knife over roll coater thereby defining the thickness of said inner layer.

35. A layered structure having light reflectivity which is temperature-dependent, said structure comprising: first and second cover layers, at least one of which is light transmissive; and an inner layer comprising a polymer and a solvent which form a homogeneous solution within a preselected temperature range and which separate into polymer-rich and solvent-rich phases outside said preselected temperature range, said polymer-rich and solvent-rich phases together being substantially more reflective of light than said homogeneous solution; said polymer comprised of individual chains joined together with interchain bonds at points along their length and joined with interface bonds to said first and second cover layers in which said first and second cover layers are sealed together by ultrasonic vibrations.

36. A layered structure in accordance with claim 35 in which said first and second cover layers are sealed together by passing said inner and first and second cover layers over a drum bearing raised ribs in a grid pattern along the surface thereof and rotating under an ultrasonic horn.

37. A layered structure having variable light reflectivity which is temperature-dependent, said structure comprising: first and second cover layers, at least one of which is light transmissive; and an inner layer comprising a polymer and a solvent which form a homogeneous solution within a preselected temperature range and which separate into polymer-rich and solvent-rich phases outside said preselected temperature range, said polymer-rich and solvent-rich phases together being substantially more reflective of light than said homogeneous solution; in which preformed polymer chains are bonded together to form said individual chains joined together with bonds, said polymer comprised of individual chains joined together with interchain bonds at points along their length and joined with interface bonds to said first and second cover layers.

* * * * *

UNITED STATES PATENT AND TRADEMARK OFFICE
CERTIFICATE OF CORRECTION

PATENT NO. : 5,377,042
DATED : December 27, 1994
INVENTOR(S) : Chahroudi, Day

It is certified that error appears in the above-indentified patent and that said Letters Patent is hereby corrected as shown below:

On title page, after Assignee insert item [*]:
The terminal 42 months of this patent has been disclaimed.

Signed and Sealed this

Twenty-sixth Day of March, 1996

Attest:

BRUCE LEHMAN

Attesting Officer      Commissioner of Patents and Trademarks